Nov. 19, 1968  H. A. ROBINSON ET AL  3,412,318
VARIABLE CAPACITOR ELECTRIC POWER GENERATOR
Filed Nov. 18, 1964  6 Sheets-Sheet 1

*Inventors*
Hugh A. Robinson
Vincent O'Gorman
Willard B. Spring
By their Attorney Carl E. Johnson United States Patent Office 3,412,318
Patented Nov. 19, 1968

3,412,318
VARIABLE CAPACITOR ELECTRIC
POWER GENERATOR
Hugh A. Robinson, Wenham, Vincent O'Gorman, Beverly, and Willard B. Spring, Topsfield, Mass., assignors to United Shoe Machinery Corporation, Flemington, N.J., a corporation of New Jersey
Filed Nov. 18, 1964, Ser. No. 412,178
19 Claims. (Cl. 322—2)

This invention relates to the provision of improved systems for the generating of electrical power. More particularly, the invention is concerned with providing apparatus for efficiently converting mechanical rotary motion into electrical output. As herein exemplified in three related embodiments, one electrostatic and the other two electromagnetic in nature, the invention is predicated on the translation of rotary motion into high frequency linear oscillation by means of a deflectible membrane, the displacements of the latter shifting a circuit coupling means, either a capacitor plate or a magnet, relative to another plate or magnet, respectively, to, in effect, "pump" electrical energy into circuitry connected to a load. Although the invention is illustrated as advantageously employing for its prime mover a gas turbine, the pressurized gas thus available also being of beneficial use for bearing purposes, it will be understood that the invention is not thus limited in scope. Also, while it will be appreciated that one or both of the illustrated embodiments are well adapted to operate in outer space, application of the invention is not restricted to such use but may well perform mundane service.

In producing an electrical output as by varying the gap between capacitor plates or between magnetic pole pieces, a mechanical input is supplied to operate a circuit coupling means. In the case of electrostatic generation the variable capacitance is best effected by plates functioning in the electrical insulation of a vacuum (or high pressure gas). Lack of a suitable barrier in prior construction prevented maintenance of high electrostatic field strength and permitted escape of deleterious lubricant, dirt, and corrosive gases from the mechanical to the electrical region. In electromagnetic generation as well as electrostatic, it is important that the zones of the mechanical input be sealed from the environment in which resultant electrical interaction is to occur at the circuit coupling means.

It accordingly is a primary object of the invention to provide an electrical power generating system reliably and efficiently driven by an hermetically sealed, rotary prime mover.

A further object of the invention is to provide an electrostatic or an electromagnetic generating system wherein an improved hermetic barrier separates mechanical input means from a circuit coupling in the form of capacitor plates or an electromagnet, and the barrier is movable to operate the coupling.

Still another object of the invention is to provide a compact electric generator operable in outer space and deriving its power from turbine fluid which is also advantageously used as a bearing medium.

In pursuance of these objects a feature of the invention resides in providing, in combination, a radially deflectable, hermetic, tubular membrane or envelope, one or more portions of the membrane constituting or mounting a movable element of a circuit coupling means, a circuit for applying electromagnetic energy to the circuit coupling means and conducting electric power to a load, and a rotary wave generator for propagating a circumferential wave of radial deflection in the membrane to actuate the circuit coupling means with high frequency. As herein shown, the wave generator is in the form of a two-lobe or elliptoidal cam. It will be understood that a wave generator or more than two lobes will often be preferred in order to provide increased output frequency for a given input speed of rotation.

Another feature of the invention comprises the shape of the deflectible tubular membrane. It preferably is a thin-wall metal shell having the configuration of a so-called double bell, i.e., its axially opposite end portions flare symmetrically to terminal zones predetermined to insure, in an intermediate cylindrical portion carrying the moveable circuit coupling element, only radial displacement parallel to the axis of symmetry. This feature, it will be recognized, makes possible considerable axial shortening of the membrane length, and has special value in the electrostatic version of the invention since parallel capacitor plate motion thus obtained maintains uniform, maximum field strength at all times throughout gap variation.

A further feature of the invention as herein illustrated resides in providing in an electrical power generator, in combination with an hermetic membrane radially deflectible to vary the gap in circuit coupling means in the form of a capacitor or electromagnet, a multilobed wave generator, a gas driven turbine for driving the wave generator, and means for utilizing turbine gas as a bearing medium between the membrane and the wave generator.

The above and other features of the invention, together with novel details and combination of parts, will now be more particularly described in connection with the illustrative generating systems, one electrostatic and two electromagnetic, and with reference to the accompanying drawings, in which.

Figure 1:
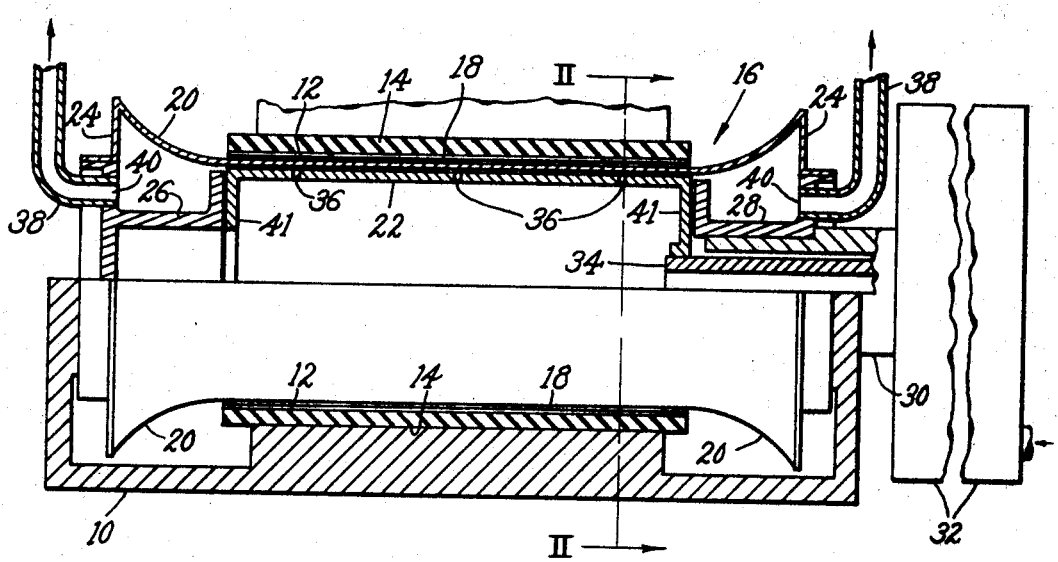
FIG. 1 is a vertical section of a turbine-driven electrostatic generator, a main casing being broken away to reveal internal structure.
Figure 2:
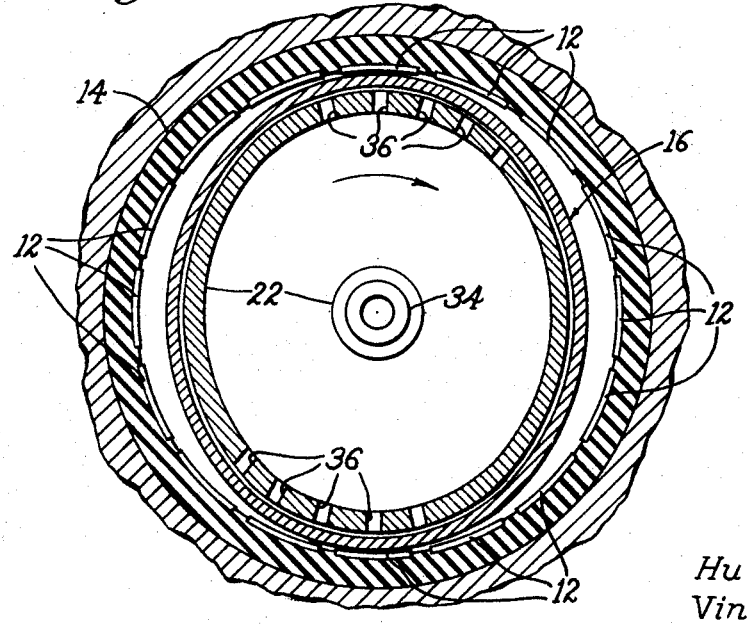
FIG. 2 is a section taken on the line II—II of FIG. 1 and showing a ported elliptoidal wave generator and a 16-plate capacitor arrangement.
Figure 3:
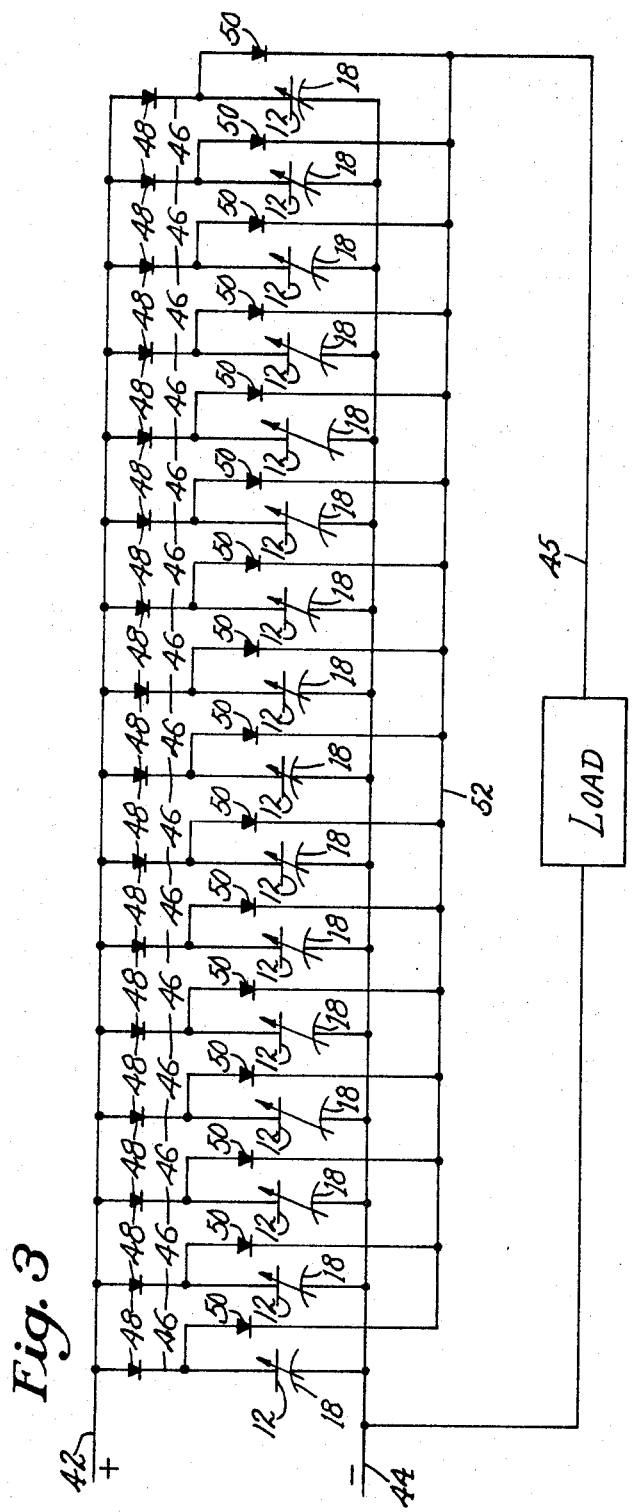
FIG. 3 is a diagram of solid state circuitry inter-connecting the variable gap capacitor plates to a load.

Describing first the electrostatic generator of FIGS. 1–3, a vacuum chamber or casing 10 (FIG. 1) is shown for providing support for a series of substantially flat, elongated outer capacitor plates 12. These are represented in FIG. 3 as lying in fixed horizontal positions and are, in fact, equally spaced apart and circumferentially arranged, being axially secured to the cylindrical inner wall of a rigid sleeve 14 of insulating material. While the sleeve 14 and stationary plates 12 are thus shown as mounted on the casing 10, it will be understood that they may be otherwise mounted and, indeed, the casing 10 may be entirely dispensed with if performance is to be had only in the vacuum of outer space. The plates 12 are sixteen in number as herein illustrated, but it will be clear that any other number may be employed depending on such factors as output characteristics desired, the diameter of the unit and the nature of the materials.

Radially opposed to the fixed "plates" 12 is a tubular, radially deflectible, hermetic membrane generally designated 16 (FIGS. 1 and 2). As shown herein intermediate straight, circumferentially spaced surface portions 18 (FIGS. 1, 3) of the membrane 16, which is commonly called a flextube and is coaxial with the sleeve 14, constitute relatively movable capacitor "plates." It will be understood that although these plates 18 are indicated as integral with the flextube 16, when preferred they may be individually mounted in radially spaced relation thereon. In addition to serving as the movable capacitor plate carrier for the circuit coupling means 12, 18, the flextube 16 also functions to provide an hermetic seal or barrier between the variable capacitance gap of the electrical system and mechanical actuating means to be described for cyclically and harmonically varying the gap. As illustrated, the flextube 16 is of thin-walled metal. In some respects its configuration resembles the thinshell mechanical transmission member disclosed in United States Letters Patent No. 3,091,979 issued June 4, 1963 in the names of H. F. Schaefer, Jr., et al. The configuration illustrated in FIG. 1 is of the "double bell" shape, its end portions 20 beyond "plate" portions 18 being flared outwardly with a curvature designed to enable the portions 18 to be deflected radially and parallel to an axis of symmetry. The flextube could be of the "single bell" or other configuration involving negative curvature as disclosed in the cited Schaefer patent, the double bell shape usually being preferred for reasons of reduction in axial length, dynamic balance with minimal stress, and by way of affording greater areas of parallel plate surface.

In its initial or relaxed condition the flextube intermediate or "plate" mounting portion 18 is substantially circular in cross section. A hollow rotary wave generator 22 (FIGS. 1 and 2) coaxial with the flextube is shown as being elliptoidal in cross section for imparting during operation a corresponding 2-lobed shape to the flextube. It will be understood that more than 2 lobes may be provided in the wave generator when desired to increase output frequency. The peripherally spaced lobes must, in the present construction, have an operating clearance (on the order of not substantially more than .001") with the internal diameter of the membrane 16. In contrast to the flexspline operation disclosed in the cited Schaefer et al. patent where spline tooth engagements produce a rotating output, the flextube membrane 16 does not itself rotate, but is bodily stationary, only its deflected lobar shape rotating. An extension of the design principles disclosed in the Schaefer et al. patent enables the cylindrical "plate" portions 18 to be joined to the flared portions 20 while minimizing flexing stresses in the membrane. To this end, in order to avoid the inter-related conditions of distortion known as "scalloping" and "coning" referred to in the mentioned Schaefer et al. patent and incurred by deflection of a thin-shell cylinder into non-circular section, the portions 20 terminates in radial flanges 24 the diameter of which is selected so that its rim points undergo substantially no axial deflection. The flanges 24 are respectively welded on collars 26, 28. The collar 26 is secured to the casting 10 by welding, and the collar 28 is press fit upon, and then welded to, a sleeve 30 axially projecting from a turbine housing 32. A tubular shaft 34 in the sleeve 30 and connected to the turbine rotor (not shown) accordingly rotatably drives the wave generator 22 which is welded onto the shaft.

Turbine gas is conducted under pressure via the shaft 34 to the interior of the wave generator 22 and allowed to radially escape therefrom in a series of bearing feed orifices 36 (FIGS. 1 and 2). These are grouped at the major axis and the groups are axially spaced to equalize bearing load throughout the cylindrical portion 18. Preferably, in the manner disclosed in United States Letters Patent No. 3,058,372 issued Oct. 16, 1962 in the name of Hugh A. Robinson, and since rotation of the wave generator 22 is not herein deemed reversible, the orifices 36 provide a fluid pressure pattern having a center slightly in advance of the major axis. In this way an evenly distributed, thin tapered fluid bearing film provides, in effect, a frictionless coupling or cushion along the lobar regions externally of the wave generator and aids it during rotation to radially displace the "plate" portions 18 of the membrane 16 relatively to the plates 12 in vacuum while preventing contact between the wave generator and the now elliptoidally shaped membrane 16. The escaping gas is confined within the membrane until it reaches vent tubes 38 (FIG. 1) having communication with ports 40 formed in the collars 26, 28. Radial flanges 41 formed on the wave generator 22 are preferably spaced slightly from adjacent radial flanges of the collars 26, 28, respectively, to provide gas bearings axially centering the wave generator.

When considered more appropriate due to the nature of the primer mover available, to the environment in which operation is contemplated, or to other factors, a hydrodynamic bearing, i.e. one employing fluid in the liquid state rather than a gaseous medium, may be used. In either case the flextube 16 advantageously serves as an hermetic barrier, it supports the radial forces imposed by the electrostatic generator, and it harmonically determines the variation in capacitance gaps (and in capacitance) between the sixteen circuit coupling means comprising the plates 12, 18.

Figure 4:
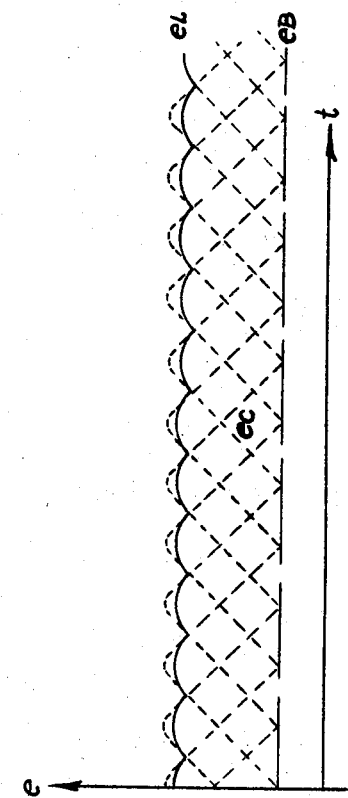
FIG. 4 is a graph indicating the general relation between input and output voltages of the electrostatic generator.

Referring now more especially to FIG. 3, a relatively low voltage is supplied for energizing the individual capacitors provided by the plates 12, 18 by lines 42, 44 coming from a suitable source, for instance a battery, not shown. Illustrative circuitry next to be explained is provided for conducting output power at higher DC voltage levels to a load in a line 45. As shown eight pairs of plates (or circuit coupling means) 12, 18 have their gaps of different dimension at any instant, two diametrically opposed pairs of plates always having substantially the same field intensity, assuming an elliptoidal wave generator The respective fixed plates 12 are connected to the line 42 by a line 46 in which there is a rectifier or diode 48 permitting unidirectional current to charge the plates 12 and thus provide, assuming high vacuum externally of the membrane and within the casing 10, a variable electrostatic field between the oppositely charged circuit coupling plates 12, 18. If the gap between any pair of capacitor plates 12, 18 is allowed to diminish while maintaining constant the voltage across the capacitor, work is done by the energy stored in the electric field and in the circuit maintaining the voltage. When the plates are to be separated (thus decreasing capacitance), a mechanical effort is required which causes increasing energy to be stored partly in the field between the plates and partly in the circuit maintaining voltage across the plates. When, as in the case of the right hand pair of plates 12, 18 of FIG. 3 having the smallest gap, capacitance is approaching a maximum value, this pair is accepting charge at a voltage determined by the rectifier 48. As this capacitance thereafter diminishes as the gap increases, the basic formula $Q=CV$ indicates that voltage is then increasing. Accordingly, since current cannot reverse in the line 46, it is diverted thru a rectifier 50 in a line 52 connected to the load line 45. The combined output of the multiple capacitors 12, 18 (current in the line 52 being irreversible) is a pulsed D.C. voltage as indicated by a full ripple line, FIG. 4.

It will be appreciated that the electrostatic system described provides a compact, efficient, and relatively uncomplicated machine for converting mechanical to electrical power. High insulation strength of the critical electric circuit coupling area is insured by the membrane or flextube 16. During rotation of the lobar wave generator, which will normally be at high speed, for instance upwards of 30,000 r.p.m. each of the "plate" portions 18 will be displaced radially through the consecutive positions indicated in FIG. 3 in each revolution (assuming an elliptoidal wave generator). Thus each plate 18, always moving parallel to the fixed plates 12 (and in high vacuum), effects gap variation with a frequency of upwards of 1,000 c.p.s. or upwards of 1,500 c.p.s. in the case of a 3-lobed wave generator, and upwards of 3,000 c.p.s. in the case of a 6-lobed wave generator. It will be understood that actual deflection of each portion 18 is considerably less than represented in FIG. 3, its amplitude being perhaps on the order of .090 inch for a flextube having a diameter of 4.1" in its cylindrical or plate carrying portion.

Figure 5:
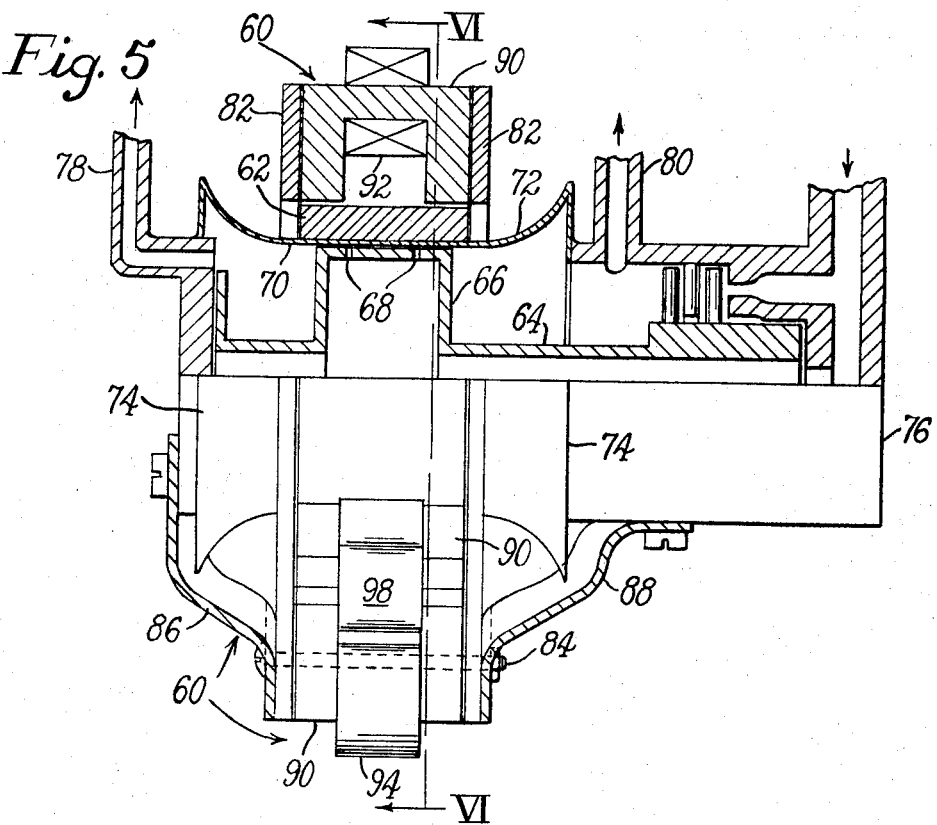
FIG. 5 is a view similar to FIG. 1 but showing somewhat schematically an electromagnetic generator.
Figure 6:
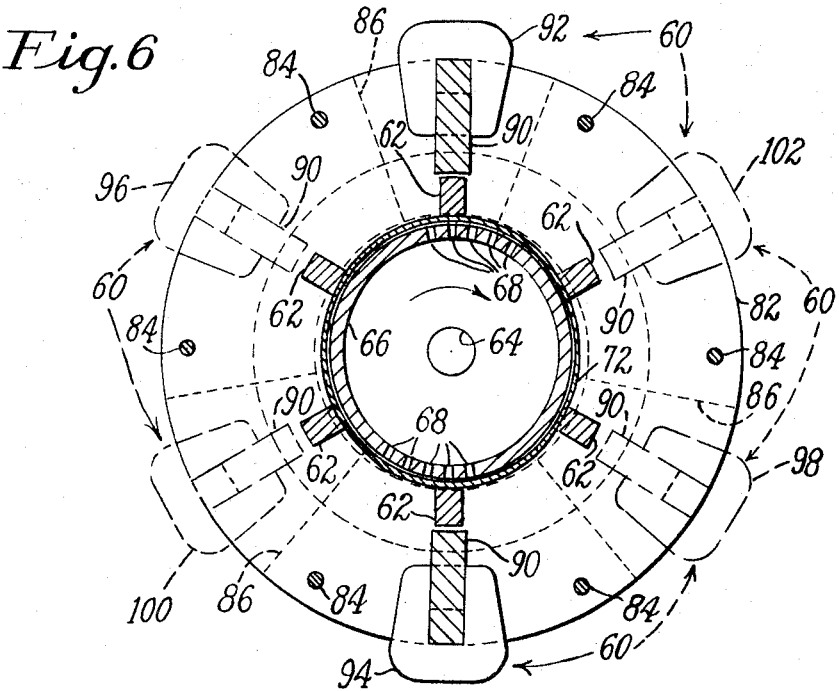
FIG. 6 is a vertical section taken on the line VI—VI of FIG. 5.
Figure 7:
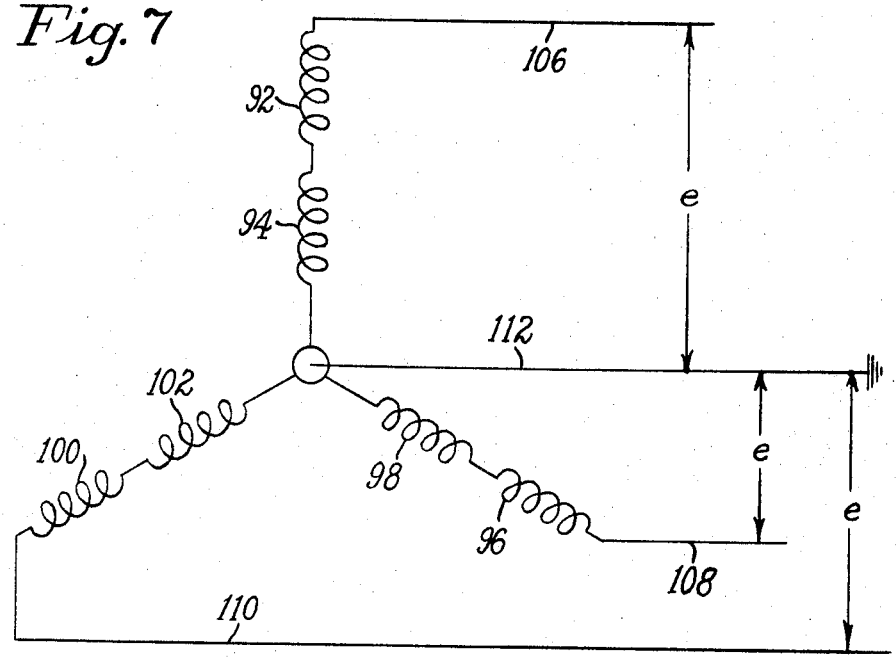
FIG. 7 is an electrical diagram of windings shown in FIG. 6.

In FIGS. 5–8 the invention in one electromagnetic aspect is shown. The circuit coupling means now comprises, not variable capacitance plates 12, 18, but fixed electromagnets 60 and magnetically permeable armatures 62, which may be of soft iron, movable relatively thereto through variable gaps. As in the electrostatic version high speed input is, for purposes of illustration, derived from a tubular turbine shaft 64. In this case the shaft 64 rotatably drives a lobar (elliptoidal) wave generator 66 integral therewith and of less axial length than that of the wave generator employed in the electrostatic generator above described. (The two systems could utilize may interchangeable components if desired.) Similarly, gas under pressure from the turbine is fed radially through spaced patterns of orifices 68 at the major axis (or axes) of the wave generator 66 to provide fluid bearing support for an initially cylindrical portion 70 of a hermetic flextube or membrane 72 corresponding to the flextube 16. In this case radial end flanges 74 of the membrane may be welded directly to a turbine housing 76 (FIG. 5). Gas pressurized for driving the turbine may either be vented by means of tubes 78, 80, or recirculated to the turbine system.

The electromagnets 60, shown herein as six in number, are spaced 60° apart and clamped between annular rings 82, 82 (FIGS. 5, 6) insulated from the magnets 60. The rings are axially secured by bolts 84. For thus supporting the rings 82, three pairs of brackets 86, 88, circumferentially staggered, respectively, receive a bolt 84 and are affixed to the housing 76. It will be apparent that other spacing and numbers of electromagnets 60 may be selected as appropriate to the size of the generator and the nature of the output desired. Each electromagnet comprises a laminated U-shaped core 90, and a coil connected in series with a diametrically opposed coil (their reference characters being shown in FIGS. 6 and 7 as 92, 94; 96, 98; and 100, 102). North and south poles of the electromagnets are disposed axially, and spaced from the axis of symmetry of the flextube 72 just sufficiently to avoid contact with confronting faces of the armature pieces 62 when the latter are displaced radially outward, in harmonic manner, by the flextube as deflected by the wave generator 66. While the armatures may be radially spaced and secured on the flextube in various ways, they are herein shown as welded to the flextube.

Figure 8:
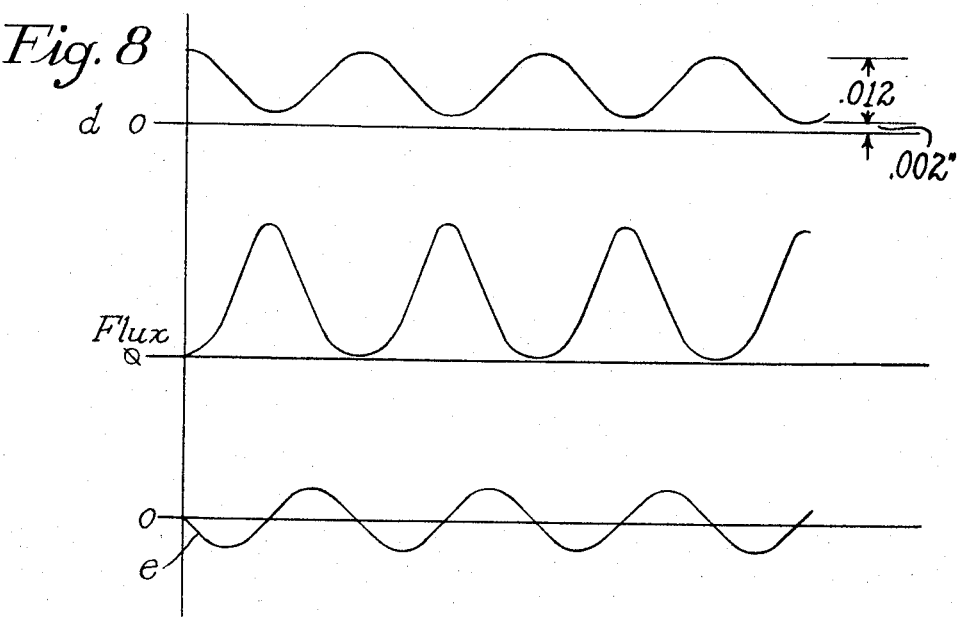
FIG. 8 is a graph illustrating output voltage of a pair of coils and other characteristics of the electromagnetic generator of FIGS. 5–7.

It will be appreciated that, when preferred, the armature pieces 62 may be disposed externally (i.e. in radial relation) with respect to the electromagnets and the latter mounted on the flextube 72. Movement of each armature 62 toward and from its energized core (90 for instance) produces an alternating current in its coil, (92 for example). Closure of the diametrically opposed gaps (and their separation) occurs simultaneously and harmonically. Hence, the alternating current flowing through each pair of opposed coils may be carried by lines 106, 108 and 110 respectively, (FIG. 7) having a voltage $e$ (FIG. 8) with respect to a common line 112 connected to ground. FIG. 8 also shows armature displacement in an arrangement wherein the amplitude is on the order of .012" and minimal gap betwen the poles is on the order of .002". The flux will, of course, vary between opposed poles substantially inversely as the gap, rising to maxima and minima cyclically as indicated in FIG. 8 which correspond timewise substantially with zero voltages. Output voltage $e$ of each pair of coils alternates fundamentally as shown in the lower portion of FIG. 8 but actually includes a number of odd harmonics.

The described electromagnetic arrangement provides a high frequency, 3-phase A.C. power system employing an elliptoidal wave generator. Higher frequency may be obtained with wave generators having additional lobes. A single phase A.C. output would be obtained with an elliptoidal wave generator if only one pair of opposed electromagnets with armatures were operated. Two phase output would be produced in an arrangement having a 2-lobe wave generator and four opposed coils; single phase output is obtained when three equispaced poles are used with a 3-lobe wave generator.

Figure 9:
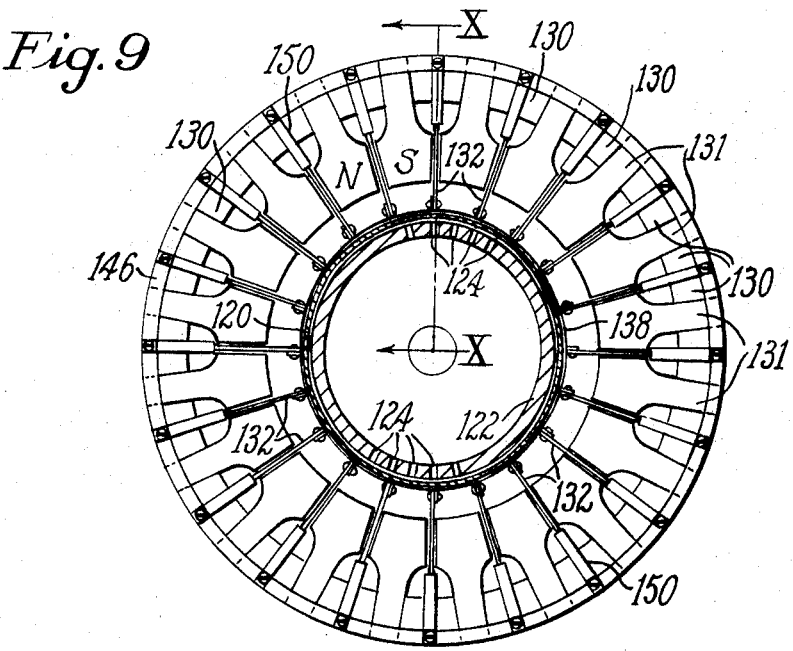
FIG. 9 is a section taken on the line IX—IX of FIG. 10, showing an alternate form of the invention.
Figure 10:
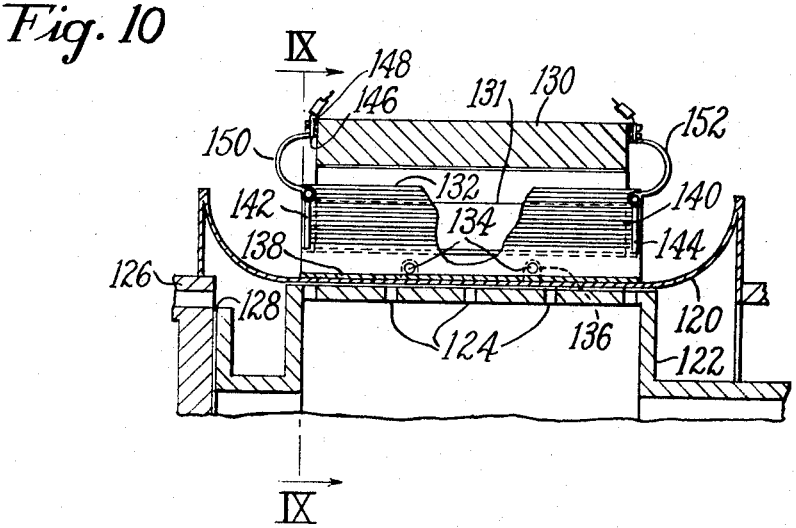
FIG. 10 is an axial section taken on the line X—X of FIG. 9.
Figure 11:
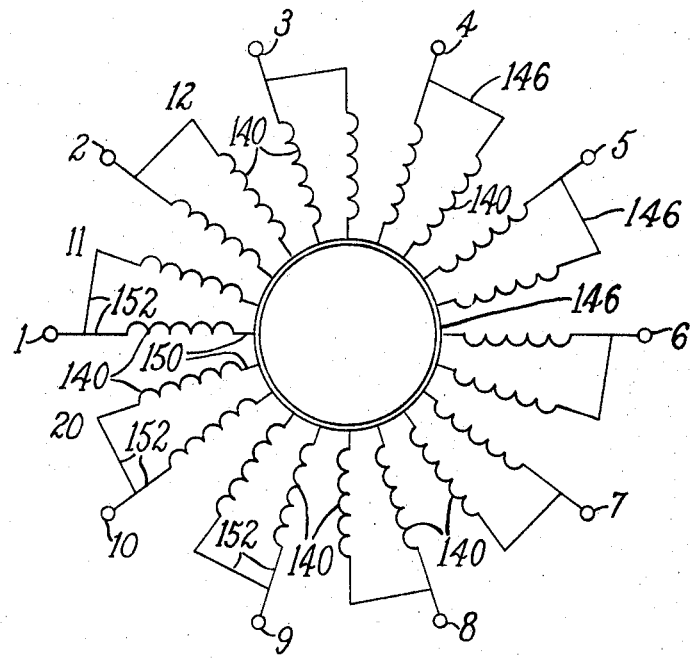
FIG. 11 is an electrical diagram for the circuit boards of FIGS. 10 and 11.
Figure 12:
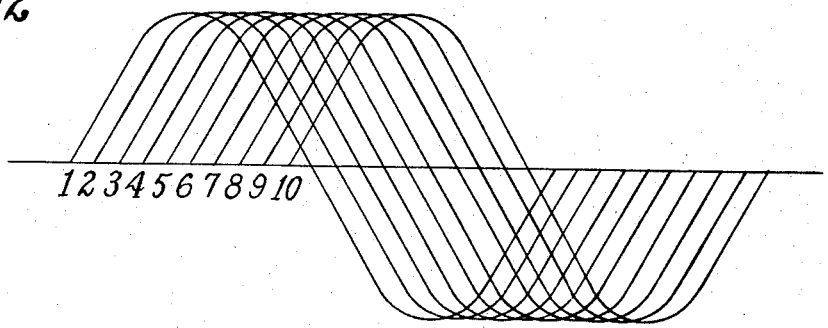
FIG. 12 is a schematic showing of the AC output derived from the generator of FIGS. 9–11.

In FIGS. 9–11, another electromagnetic form of the invention is illustrated. A non-rotating flextube or hermetic membrance 120 is radially deflected circumferentially by an elliptoidal wave generator 122 rotatably driven about a common axis. While other bearing means can be employed for lower speeds, at the higher operating speeds contemplated in this and the above-described forms of the invention, a hydro-dynamic bearing is preferred necessitating major axis orifices 124 in the wave generator. As in the other embodiments, the membrane 120 is welded to a turbine housing 126, and the wave generator 122 preferably has a pair of gas bearings 128 (one only shown in FIG. 10) provided by spaced radial walls of the housing and the generator to effect axial centering. Circumferentially and coaxially disposed about the membrane 120 is a stator comprised of a plurality of spaced permanent magnets 130 and soft iron cores 131, in this case 20 each in number, which constitute 10 pairs of poles arranged diametrically opposite one another. For providing a high current-low voltage type of A.C. output (FIG. 12) a circular series of radially extending non-conductive, rectangular pattern carriers in the form of printed circuit boards 132 is mounted for radial motion between the adjacent poles, respectively. To this end each board is secured as by rivets 134 to struck-up ears 136 formed from a flexible holder or annulus 138. The latter is mounted in close fitting relation to the exterior of the membrane so that its continuous circumferential waves of radial deflection are imparted harmonically to the diametrically opposed pairs of boards 132 in succession. Each of these boards with its circuitry may accordingly be considered to be the movable portion of circuit coupling means.

It will be understood that, if preferred, in lieu of the annulus 138, axial board mounting strips may be secured to the membrane 120. It will be further understood that if preferred, radial displacement imparted to the boards (to cause their conductors to cut the paths of flux) may be derived from a wave generator operating externally of a membrane rather than internally thereof as shown herein.

Each printed circuit board 132 preferably carries on its opposite faces a pattern of conductors consisting of numerous axil lines 140 (FIG. 10) connected in parallel to considerably broader radial bars 142, 144 located at opposite ends of both sides of the boards. D.C. input to the several boards is via a line connected to a ring 146 secured to an insulator ring 148 fast on the magnets 130. Flexible, flat leads 150 (FIGS. 10 and 11) may have eyelet connection to the ring 148 (FIGS. 9 and 10) and to the respective bars 142 of each board. Output leads 152 from the bars 144 are connected to the output terminals designated 1 to 10 inclusive of the diametrically opposed boards 132, respectively, as shown in FIG. 11. Accordingly, each of the circuit lines 140 on one board 132 is caused, during the interval between each passing of the major axis and the minor axis of the wave generator 122, to cross with harmonic motion in one direction the path of magnetic flux between radial north and south faces of adjacent cores 131. Consequently, the ten pairs of output leads 148 successively carry a current first in one direction and then in the other direction, the net alternating current output wave form being indicated in FIG. 12.

It will be clear from the foregoing that this invention provides, in alternate forms, effective generating systems predicated on the relative motion of circuit coupling means in an electromagnetic field as effected by a circumferential wave of radial deflection in a harmonic membrane. The advantages of such systems including those of compactness, hermetic capability, and relatively low weight are thought to be especially applicable to service in outer space.

Having thus described our invention, what we claim as new and desire to secure by Letters Patent of the United States is:

1. An electric power generating system comprising, a circuit including a circuit coupling means having a variable gap, a deflectible membrane mounting a movable portion of the circuit coupling means, means for applying electrical energy to the circuit coupling means, and a wave generator operable on the membrane to deflect it cyclically thus to vary the gap and effect an electrical output.

2. An electric power generating system comprising, a circuit including a circuit coupling means having a variable gap, a radially deflectible membrane for varying the gap of the circuit coupling means, means for applying electrical energy to the circuit coupling means, and a rotary wave generator for causing the membrane cyclically to deflect and vary the gap whereby an electrical output is produced in said circuit.

3. A system as set forth in claim 2 wherein the membrane is an hermetic flextube at least one end portion of which is of flaring curvature, and another portion of which supports about an axis of symmetry a movable portion of the circuit coupling means, said flaring end portion having a configuration adapted to maintain said movable portion of the circuit coupling means in parallel relation to said axis.

4. In an electric generating system, the combination with a lobar wave generator rotatable about an axis, of an hermetic flextube having a surface radially deflectible by the wave generator and coaxial therewith, a circumferential series of fixed capacitor plates arranged about the flextube and electrically insulated from one another, the deflectible surface of the flextube constituting with said fixed plates a plurality of circuit coupling capacitors having their respective gaps variable harmonically by the wave generator, means including a rectifier for applying low voltage to the respective capacitors, and a circuit including a rectifier connected to each capacitor for conducting to a load at higher voltage the output of said capacitors as their respective gaps are increased.

5. An electric generating system as set forth in claim 4 wherein a casing for mounting the fixed capacitor plates is provided and adapted, with the flextube, to maintain the capacitor gaps in vacuum.

6. A system as set forth in claim 4 and further characterized in that the wave generator is operatively connected to a gas turbine, and axially spaced, radial bearing orifices are formed in the wave generator adjacent to its major axis for receiving turbine gas as a bearing medium to be distributed between the inside of the flextube and the outside of the wave generator.

7. In a device for converting mechanical input to electrical output, an electrical circuit including at least one circuit coupling means having a gap and a movable member for varying the gap, means for applying electromagnetic energy to the circuit coupling means, a flextube mounting the movable member on one side thereof, and mechanical input means operable on the opposite side of the flextube from the member for harmonically varying the gap, said flextube having a configuration adapted hermetically to seal the environment of the gap from that of said mechanical means.

8. A device as set forth in claim 7 wherein the circuit coupling means is a capacitor, and the mechanical input means is a rotary, lobar wave generator coaxial with the flextube.

9. A device as set forth in claim 7 wherein the circuit coupling means is an electromagnet, and the mechanical input means is a wave generator coaxial with the flextube, the movable member being of iron welded axially on the flextube.

10. An electrostatic generator comprising a circular series of elongated capacitance plates, means mounting said plates and maintaining them electrically insulated from one another, means for charging the plates, a lobar wave generator rotatable about an axis, an hermetic flextube of thin-walled metal extending coaxially between the wave generator and the circular series of capacitance plates to seal the latter from the wave generator, a casing for maintaining the plates in a vacuum, the flextube having a flaring portion extending axially beyond the capacitance plates for anchorage to the casing, means for rotating the wave generator to impart to the flextube a circumferential wave of radial deflection effectively varying the capacitance gap between the flextube and said plates, the configuration of the flaring portion of the flextube being predetermined to maintain its radially deflected portion adjacent to the plates in parallel relation thereto, and a circuit including a rectifier for delivering output power generated at each plate when its gap is increased.

11. A power generating system comprising a housing for a prime mover, a double bell-shaped tubular membrane having a radially deflectable intermediate portion, at least one end portion of the membrane being hermetically secured on the housing, a wave generator coaxial with the membrane and operatively connected to the prime mover for propagating circumferentially a wave of radial deflection in said intermediate portion of the membrane, and circuitry including at least one variable gap circuit coupling means in the form of an electromagnet and its armature, one of the electromagnet and the armature being mounted for deflection by said intermediate membrane portion to vary the circuit coupling gap and produce A.C. output in the circuitry.

12. A system as set forth in claim 11 wherein the wave generator is of elliptoidal shape, and the circuit coupling means includes three pairs of diametrically opposed, equispaced electromagnets the armatures of which are secured on said intermediate membrane portion to provide 3-phase voltage output.

13. An electric power generating system comprising, a circuit including a circuit coupling means, a deflectable membrane mounting a movable portion of the circuit coupling means, means for applying electromagnetic energy to the circuit coupling means, and a wave generator operable on the membrane to deflect it harmonically thus to effect an electrical output.

14. A generating system as set forth in claim 13 and further characterized in that said circuit coupling means comprises a series of permanent magnets having their pole faces of opposite polarity in closely spaced relation, and the movable portion of the circuit coupling means includes a plurality of conductive pattern carriers respectively interposed for movement between said spaced magnet pole faces.

15. An electric generating system comprising, a rotary wave generator, a circular series of stationary, permanent magnets arranged coaxially with respect to the wave generator, poles of opposite polarity of the magnets being closely spaced, a tubular membrane mounted coaxially with the wave generator and radially deflectable thereby to propagate a circumferential wave of displacement, a plurality of radially disposed, conductive pattern carriers respectively extending in the magnetic field between said opposite magnet poles and radially responsive to said displacement wave of the membrane, and circuit means for energizing the conductive patterns of the carriers.

16. A generating system as set forth in claim 15 wherein the membrane is non-rotatably and hermetically mounted for operation within the series of magnets and externally of the wave generator.

17. A generating system as set forth in claim 15 wherein said permanent magnets extend axially of the wave generator and the membrane, and the pattern carriers are non-conductive, sheet-like members radially displaceable edgewise in said magnet field.

18. A generating system as set forth in claim 17 wherein the conductive pattern of said carriers extends on both sides thereof, respectively, and includes axial lines electrically connected in parallel.

19. A generating system as set forth in claim 18 wherein the wave generator is elliptoidal in shape, and diametrically opposed pairs of said pattern carriers have their conductive patterns connected in series to provide an A.C. output.

References Cited

UNITED STATES PATENTS

| | | | |
|---|---|---|---|
| 2,194,839 | 3/1940 | Van de Graaf | 310—6 |
| 2,857,536 | 10/1958 | Light | 310—82 |
| 3,013,201 | 12/1961 | Goldie | 322—2 |
| 3,107,326 | 10/1963 | Denholm | 322—2 |
| 3,147,425 | 9/1964 | Christoff | 323—90 |
| 3,169,201 | 2/1965 | Spring et al. | 74—640 XR |
| 3,196,713 | 7/1965 | Robinson | 74—640 |
| 3,206,703 | 9/1965 | Ferrell | 74—640 XR |
| 3,242,399 | 3/1966 | Frisch | 317—249 |

FOREIGN PATENTS

| | | | |
|---|---|---|---|
| 523,584 | 7/1940 | Great Britain | 317—249 |

MILTON O. HIRSHFIELD, *Primary Examiner.*

D. F. DUGGAN, *Assistant Examiner.*